(12) United States Patent
Manzardo et al.

(10) Patent No.: US 8,078,137 B2
(45) Date of Patent: Dec. 13, 2011

(54) METHOD AND APPARATUS FOR EMERGENCY NUMBER AWARENESS

(75) Inventors: Marcel Manzardo, Los Gatos, CA (US); William J. Beyda, Cupertino, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1001 days.

(21) Appl. No.: 11/879,635

(22) Filed: Jul. 18, 2007

(65) Prior Publication Data
US 2009/0023419 A1    Jan. 22, 2009

(51) Int. Cl.
*G06F 15/16* (2006.01)
(52) U.S. Cl. .................. 455/404.1; 455/414.1
(58) Field of Classification Search .............. 455/404.1, 455/414.1, 428; 370/352, 401
See application file for complete search history.

(56) References Cited

U.S. PATENT DOCUMENTS

| 2005/0117567 A1* | 6/2005 | Kimura | 370/352 |
| 2008/0140841 A1* | 6/2008 | Ott | 709/226 |

* cited by examiner

*Primary Examiner* — Sam Bhattacharya
(74) *Attorney, Agent, or Firm* — Buchanan Ingersoll & Rooney PC

(57) ABSTRACT

A telecommunications device includes a laptop computer having a telephony soft client that may run, for example, in a browser window. The telephony soft client includes a utility to allow it to determine the laptop's local external IP address and from it, the local country. The telephony soft client then performs a lookup of the local country's emergency telephone number, either from a local table or from a specially maintained remote database. The local emergency telephone number can then be displayed, or programmed to a "quick dial" key.

20 Claims, 5 Drawing Sheets

METHOD AND APPARATUS FOR EMERGENCY NUMBER AWARENESS

BACKGROUND OF THE INVENTION

1. Field of the Invention

This invention relates to telecommunications systems. More particularly, the invention relates to a system and method for determining country-specific emergency telephone numbers.

2. Description of the Related Art

It is becoming increasingly common for individuals to travel with their telephony devices to foreign countries so that they are in contact with, for example, the main office at all times. Such telephony devices include, for example, cellular telephones and mobile computing devices such as laptop computers equipped with telephony "soft clients."

Such laptop computers typically include microphones and speakers and software that implements "voice over IP" or "voice over Internet" functionality. The laptop computers connect to the Internet via, for example, a wireless Internet hot spot (e.g., a Wi-Fi access point implementing one of the IEEE 802.11x standards) and are provided telephone functionality based on, for example, the Session Initiation Protocol (SIP) or the H.323 Recommendation.

For travelers, rapid handling of security and medical emergencies is advantageous. Various countries implement a common emergency number for police and medical emergencies. In the United States, the number is "911." Other countries, however, implement their own emergency telephone numbers, which may not be known to the casual or occasional business traveler. As such, there is a need for such travelers to be able to informed of and access such numbers.

SUMMARY OF THE INVENTION

A telecommunications device in accordance with embodiments of the present invention includes a laptop computer having a telephony soft client that may run, for example, in a browser window. The telephony soft client includes a utility to allow it to determine the laptop's local external IP address and from it, the local country. The telephony soft client then performs a lookup of the local country's emergency telephone number, either from a local table or from a specially maintained remote database. The local emergency telephone number can then be displayed, or programmed to a "quick dial" key.

The local IP address may be determined in a variety of ways. In one embodiment, the local IP address is determined from the local router using the dynamic host control protocol (DHCP) handshake protocol. In other embodiments, one or more publicly available services or freeware tools are used to determine the current external IP address. Finally, in some embodiments, an enterprise can set up a service to relay IP addresses to its clients or employees. Once the IP address is determined the country can be found by using the WHOIS protocol. The emergency number can then be found either by accessing a local or remote storage.

A telecommunications method in accordance with embodiments of the present invention includes determining a local IP address of a local router; determining from the local IP address a situs country; and determining an emergency telephone number of the situs country. Additional embodiments of the present invention further display or program the emergency number as a quick dial number.

A telephony device in accordance with embodiments of the present invention includes a telephone controller and a web browser type interface. The telephone controller interacts with the web browser to determine a local IP address of a situs, and from it, the situs country. The telephony controller can then perform a lookup of the corresponding country's emergency telephone number for display or quick key programming.

A telecommunications device, in accordance with embodiments of the present invention includes a processor; a network interface configured to couple the device to a voice network and the Internet; and an emergency number utility operably coupled to the network interface and configured to determine a situs country and program an emergency telephone number corresponding to the situs country.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION OF EMBODIMENTS OF THE INVENTION

Figure 1:
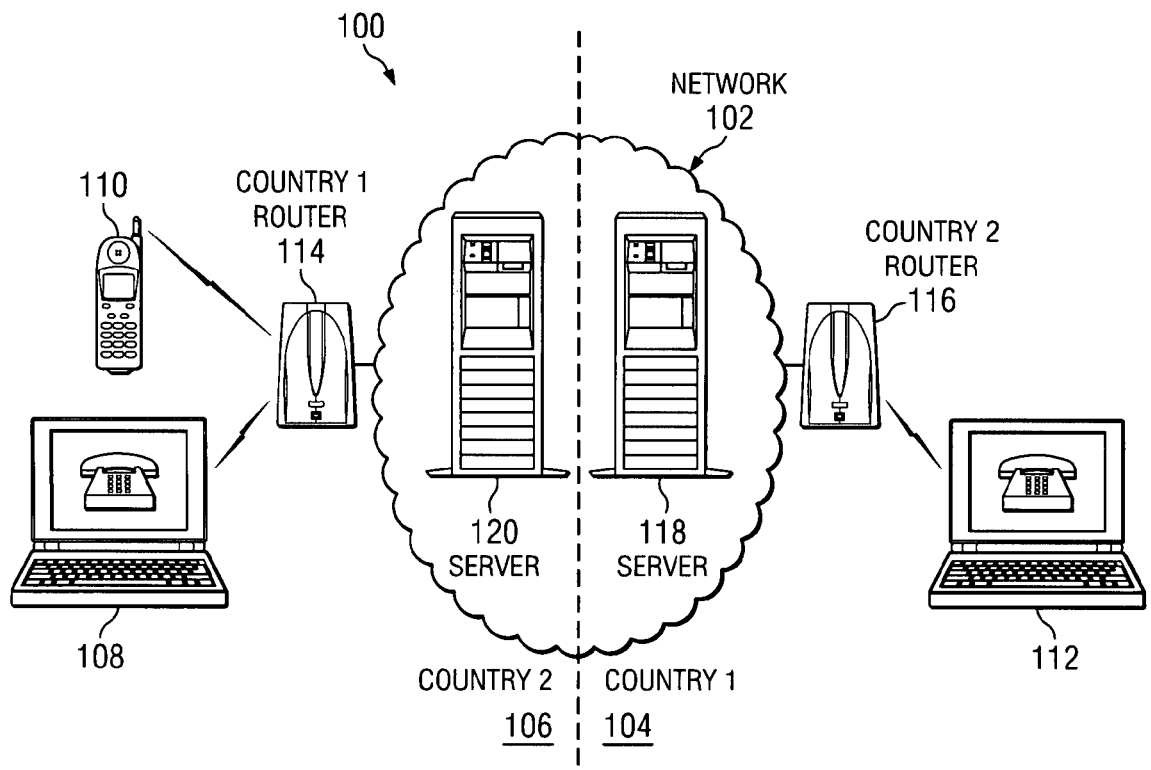
FIG. 1 illustrates an exemplary system according to embodiments of the present invention.

Turning now to the drawings and, with particular attention to FIG. 1, a diagram of a telecommunication system 100 that can be used to implement software and hardware embodiments in accordance with the present invention is shown. In some embodiments, one or more of the components of the system 100 are connected to or in communication with each other via a communication network 102, over which users can send and receive telephone calls.

The network 102 may be or include the public switched telephone network (PSTN), the Internet, World Wide Web, a local area network, or some other public or private computer, cable, telephone, client/server, peer-to-peer, or communication network or intranet. In some embodiments, the communication network 102 can also include other public and/or private wide area networks, local area networks, wireless networks, data communications networks, or connections, intranets, routers, satellite links, microwave links, cellular or telephone networks, radio links, fiber optic transmission lines, ISDN lines, T1 lines, DSL connections, etc. Moreover, as used herein, communications include those enabled by wired or wireless technology. In some embodiments, some or all of the network 102 may be implemented using a TCP/IP network and may implement voice or multimedia over IP using, for example, the Session Initiation Protocol (SIP). All of portions of the network 102 may span or be in communication with devices in one or more countries, as shown at 104, 106.

User devices, such as user devices 108, 110, 112, may be connected to or in communication with the telecommunications network 102. In certain embodiments, the user devices 108, 110, 112 may be implemented as telephones, cellular telephones, PDAs, or mobile computing devices, such as computers, hard or soft clients, etc. For example, user devices 108, 110, 112 may be embodied as laptop personal computers implementing the Windows XP operating system and the Explorer web browser. In addition, the user devices 108, 110, 112 may include telephony and other multimedia messaging capability using, for example, peripheral cameras, Webcams, microphones, and speakers (not shown) or peripheral telephony handsets, such as the Optpoint handset available from Siemens Communication, Inc. The telephony client may implement a voice over IP client or may implement a conventional telephone. In other embodiments, the user devices 108, 110, 112 may be implemented as cellular telephones including Internet capabilities.

In certain embodiments, the system 100 may also include other hardware and/or software components (e.g., gateways, proxy servers, registration server, presence servers, redirect servers, databases, applications, etc.) such as, for example, hardware and software used to support a SIP (Session Initiation Protocol) or other protocol based infrastructure for the system 100 and allow the registration of SIP devices in the system 100.

As shown, one or more servers 118, 120 may be provided that provide services to the user devices and assign IP addresses using, for example the dynamic host control protocol (DHCP). Also shown are one or more routers 114, 116, that implement, for example, WiFi access points, implementing, for example, one or more of the IEEE 802.11x wireless interface standards.

In operation, as will be explained in greater detail below, when a mobile computing device 108, 110, 112 logs in to an Internet hot spot or access point 114, 116, it is assigned an IP address by a corresponding server. A user may then undertake a procedure in accordance with embodiments of the present invention to determine a local situs country's emergency telephone number, for example, by determining an external, local IP address, a country, and then performing a lookup of the corresponding emergency number.

Figure 2A:
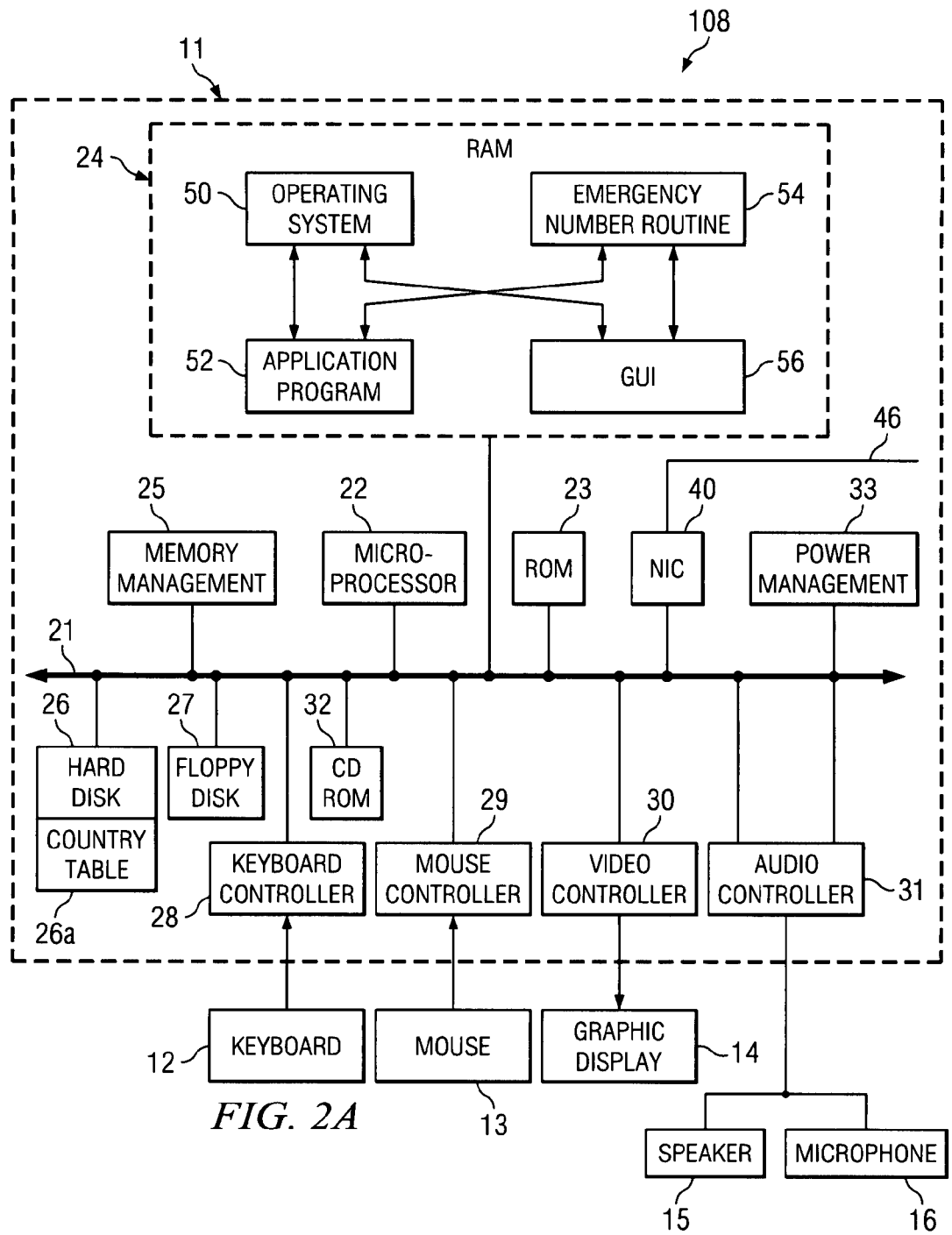
FIG. 2A and FIG. 2B illustrate exemplary mobile computing devices according to embodiments of the present invention.

FIG. 2 shows a block diagram of components of the mobile computing device, e.g., personal, or laptop computer shown in FIG. 1. In some embodiments, the mobile computing device 100 may implement one more elements of the methods disclosed herein.

The system unit 11 includes a system bus or a plurality of system buses 21 to which various components are coupled and by which communication between the various components is accomplished. The microprocessor 22 is coupled to the system bus 21 and is supported by the read only memory (ROM) 23 and the random access memory (RAM) 24 also connected to the system bus 21. The computer 100 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 22. Other suitable processors may be available from Freescale, Inc., AMD, or Sun Microsystems, Inc. The processor 22 also may be embodied as one or more microprocessors, computers, computer systems, etc.

The ROM 23 contains among other code the basic input output system (BIOS) which controls basic hardware operations such as the interaction of the disk drives and the keyboard. The ROM 23 may be embodied, e.g., as flash ROM. The RAM 24 is the main memory into which the operating system and applications programs are loaded. The memory management chip 25 is connected to the system bus 21 and controls direct memory access operations including passing data between the RAM 24 and hard disk drive 26 and floppy disk drive 27. A CD ROM drive (or DVD or other optical drive) 32 may also be coupled to the system bus 21 and is used to store a large amount of data, such as a multimedia program or a large database.

Also connected to the system bus 21 are various I/O controllers: The keyboard controller 28, the mouse controller 29, the video controller 30, and the audio controller 31. The keyboard controller 28 provides the hardware interface for the keyboard; the mouse controller 29 provides the hardware interface for the mouse 13 (or other cursor pointing device); the video controller 30 is the hardware interface for the video display 14; and the audio controller 31 is the hardware interface for the speakers 15 and microphone 16. The speakers 15 and the microphone 16 allow for audio communication during telephony operation. In operation, keyboard strokes are detected by the keyboard controller 28 and corresponding signals are transmitted to the microprocessor 22; similarly, mouse movements and button clicks are detected by the mouse controller and provided to the microprocessor 22. Typically, the keyboard controller 28 and the mouse controller 29 assert interrupts at the microprocessor 22.

One or more network interfaces 40 enable communication over a network 46, such as a packet network. The network interfaces 40 may be implemented as wired or wireless network interfaces. More particularly, the network interface 40 may include or implement an H.323 Recommendation interface, or SIP interface, to allow for telephony or multimedia communications via a packet switched network 46, as will be explained in greater detail below.

One embodiment of the present invention is as a set of instructions in a code module resident in the RAM 24. Until required by the computer system, the set of instructions may be stored in another computer memory, such as the hard disk 26, on an optical disk for use in the CD ROM drive 32, or a floppy disk for use in the floppy disk drive 27.

As shown in the figure, the operating system 50, the telephony client application or telephony application program 52 are resident in the RAM 24. The operating system 50 functions to generate a graphical user interface on the display 14. The telephony application program 52 performs telephone functionality, including generation of a telephony client window in the GUI 56. The GUI may be embodied, for example, as a web browser-type interface. In addition, an emergency number determination routine 54 may be provided, which determines the country situs emergency number in accordance with embodiments of the present invention.

In addition, a country table 26a, shown stored in hard disk 26, may be provided, which maintains a table of countries and corresponding emergency telephone numbers, as will be explained in greater detail below.

Execution of sequences of the instructions in the application program 52 and the emergency number routine 54 causes the processor 22 to perform various of the process elements described herein. In alternative embodiments, hard-wired circuitry may be used in place of, or in combination with, software instructions for implementation of some or all of the methods described herein. Thus, embodiments are not limited to any specific combination of hardware and software.

The processor 22 and the data storage device 26, 27, 32 in the computer 108 each may be, for example: (i) located entirely within a single computer or other computing device; or (ii) connected to each other by a remote communication medium, such as a serial port cable, telephone line or radio frequency transceiver. In one embodiment, the computer 100 may be implemented as one or more computers that are connected to a remote server computer, as will be explained in greater detail below.

Figure 2B:
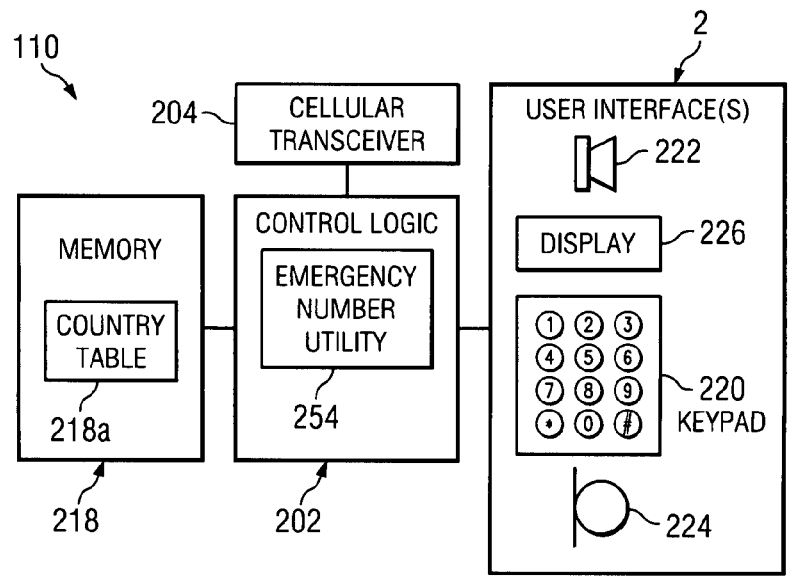

As noted above, embodiments of the present invention may be implemented in or in conjunction with a telephone, such as a wireless or cellular telephone. An exemplary cellular telephone 110 including voice dialing capabilities in accordance with an embodiment of the present invention is shown in FIG. 2B.

In some embodiments, the cellular telephone 110 may implement one or more elements of the methods disclosed herein. As shown, the cellular telephone includes control logic 202 and cellular transceiver 204. The cellular transceiver 204 allows communication over a cellular telephone network, such as a GSM or GPRS based cellular telephone network. The control logic 202 generally controls operation of the cellular telephone and includes a emergency number routine or utility 254 in accordance with embodiments of the present invention.

The control logic 202 interfaces to a memory 218 for storing, among other things, a list of emergency numbers and corresponding countries 218a. The control logic 202 also interfaces to a user interface(s) 210. The user interface(s) 210 can include a keypad 220, speaker 222, microphone 224, and display 226. The keypad may include one or more "hard" keys and may be implemented in whole or in part as a cursor pointing device in association with one or more "virtual" keys on the display 226. In general, a user may make use of the keypad 220 and display 226 to enter contact information, and may speak into the microphone to provide audio input(s). It is noted that other interfaces, such as voice activated interfaces may be provided. Thus, the figure is exemplary only. An exemplary cellular telephone that may be suitably modified for use with embodiments of the present invention is the SX66, available from Siemens Comm., Inc.

Figure 3:
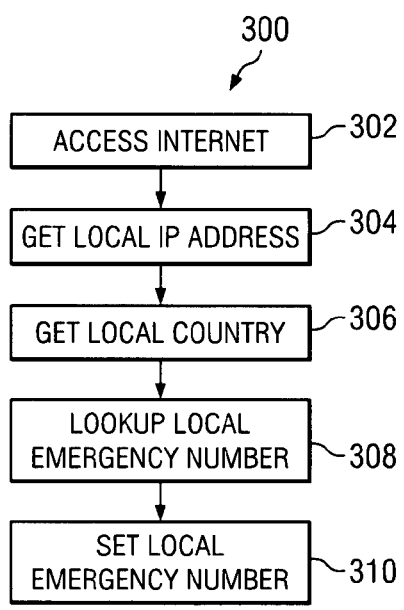
FIG. 3 is a flowchart illustrating operation of an embodiment of the present invention.

FIG. 3 illustrates a flowchart 300 of an embodiment of the present invention. The particular arrangement of elements in the flowchart 300 is not meant to imply a fixed order to the elements; embodiments can be practiced in any order that is practicable.

In particular, in a process step 302, a user can employ his mobile computing device to access the Internet or World Wide Web. As discussed above, this can include the user employing a browser such as Microsoft Explorer or Mozilla Firefox in a notebook computer equipped with a suitable network interface, or in a suitably equipped cellular telephone or other device.

In a process step 304, the user can employ his mobile computing device emergency number utility to obtain the local IP address. As will be explained in greater detail below, a variety of methods are available for determining the address. These can include, for example, querying private or public servers or services.

In a process step 306, the user can employ to emergency number utility to use the IP address to find the local country. For example, as will be discussed in greater detail below, the emergency number utility can make use of the WHOIS protocol to determine the country using the IP address.

In a process step 308, the local country is used to obtain the local country emergency number. For example, the local country information can be used to search a country-emergency number table or database. As noted above, the table or database can be stored locally or remotely.

Finally, in a process step 310, the local emergency number can be displayed to the user or can be programmed as a quick dial number.

As noted above, a variety of avenues may be used to obtain the local IP address information. Turning now to FIG. 4A-FIG. 4D, a variety of such methods are illustrated and discussed.

Figure 4A:
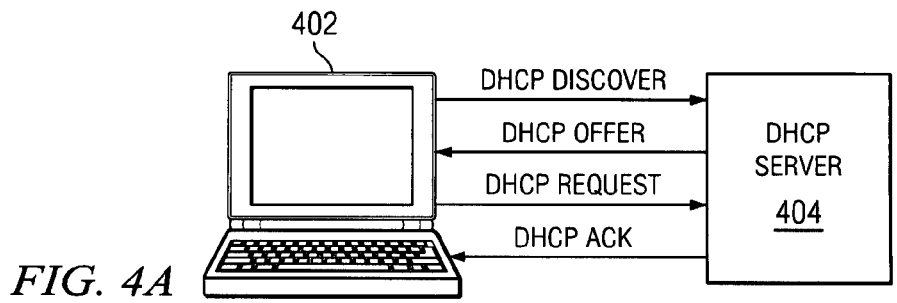
FIG. 4A-FIG. 4D are diagrams schematically illustrating determining an IP address according to embodiments of the present invention.

As shown in FIG. 4A, a mobile computing device can obtain the IP address through the response to the Dynamic Host Control Protocol (DHCP) handshake protocol. As shown, a mobile computing device 402 connects to the Internet and sends a DHCPDISCOVER message to a DHCP server 404 on the network. The DHCP server 404 checks its list of available IP addresses and responds with a DHCPOFFER, containing the reserved IP address. The mobile computing device 402 returns a DHCPREQUEST to request the IP address, to which the DHCP server 404 responds with a DHCPACK, whereupon the IP address is assigned to the mobile computing device 402. In accordance with embodiments of the present invention, the IP address from this exchange is read and used as the IP address for purposes of determining a situs country.

Figure 4B:
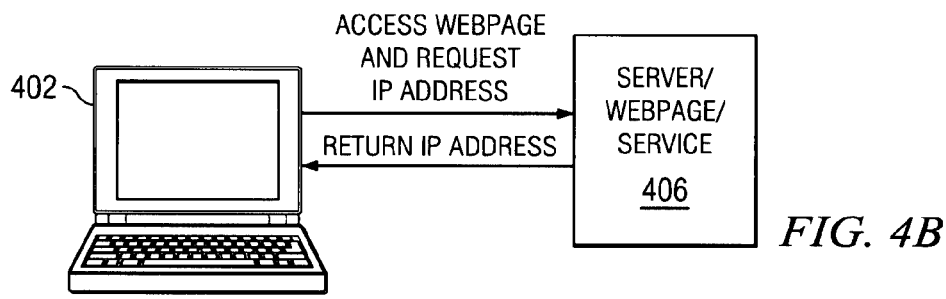

Another method by which the IP address may be obtained is illustrated schematically in FIG. 4B. Such an embodiment employs a publicly available web or Internet service 406 to relay an IP address back to the user. For example, the web site at http://www.speakeasy.net/speedtest provides a "speed test" that includes a display of the user's IP address on a web page to which the user of the device has navigated. Such publicly available web pages derive the IP address from the information sent to them by the user's browser on the mobile computing device 402 as it navigates to the corresponding web page. A utility in accordance with embodiments of the present invention reads the IP address as it is displayed and uses it for the basis of determining the situs country, as will be explained in greater detail below.

Figure 4C:
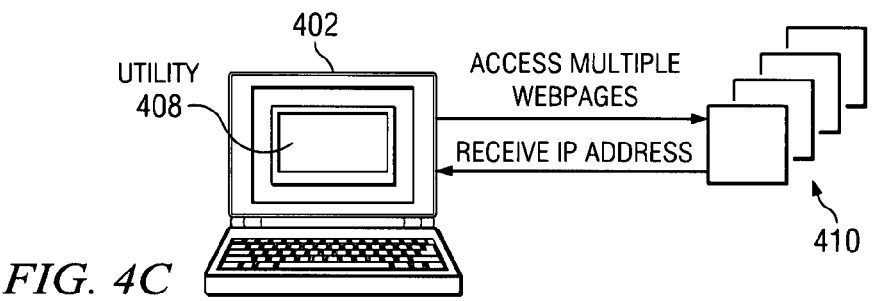

FIG. 4C illustrates another method for determining the IP address. In FIG. 4C, a utility 408, such as a freeware utility, is downloaded to the mobile computing device 402. When the mobile computing device 402 is connected to the Internet, the utility 408 can be used to determine the IP address by querying one or more servers or services 410. An example of such a utility is the IP2 freeware utility available from http://www.snapfiles.com/get/ip2.html. According to embodiments of the present invention, the utility 408 provides or makes available an IP address that can be read by the emergency number utility 254.

Figure 4D:

Still another method is shown in FIG. 4D. In the implementation illustrated, an enterprise such as a corporation can set up a web server 412 that is dedicated in part or completely to determining the IP address of known parties. That is, a user can navigate to the appropriate web page and have his IP address displayed to him, in a manner similar to that shown in FIG. 4B or 4C. However, in this case, the service is provided by the user's enterprise In some implementations, the user's service provider can implement the server.

Once the IP address is determined and available, the system according to embodiments of the present invention determines therefrom the situs country where the IP address has been assigned. One method of doing so is to employ the WHOIS TCP-based query-response protocol.

Figure 5:
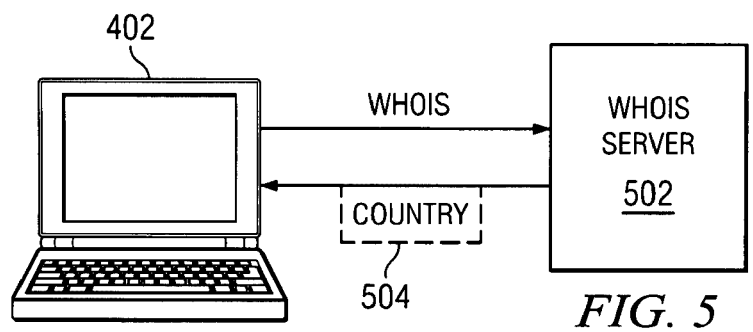
FIG. 5 is a diagram schematically illustrating determining a situs country according to embodiments of the present invention.

Thus, as shown in FIG. 5, embodiments of the present invention provide a utility or access to a utility whereby the user can send a WHOIS query to a WHOIS server 502. In particular, the request for information includes the IP address found previously. The WHOIS server 502 responds with standard WHOIS information, including the address of the IP address holder. The emergency number utility 254 reads the address and determines the country.

More particularly, shown in FIG. 5 is a user device 402 and a WHOIS server 502. In operation, the user device can send a WHOIS request identifying including the IP address to the WHOIS server 502. In response, the WHOIS server replies with a report 504 including the situs country.

Once the IP address and the country have been determined, the emergency number utility 204 queries the table or database 218*a* for the emergency telephone number corresponding to the country found. As noted above, the table can be stored locally, such as by downloading from a remote server, or can be accessed from a remote source.

Figure 6:
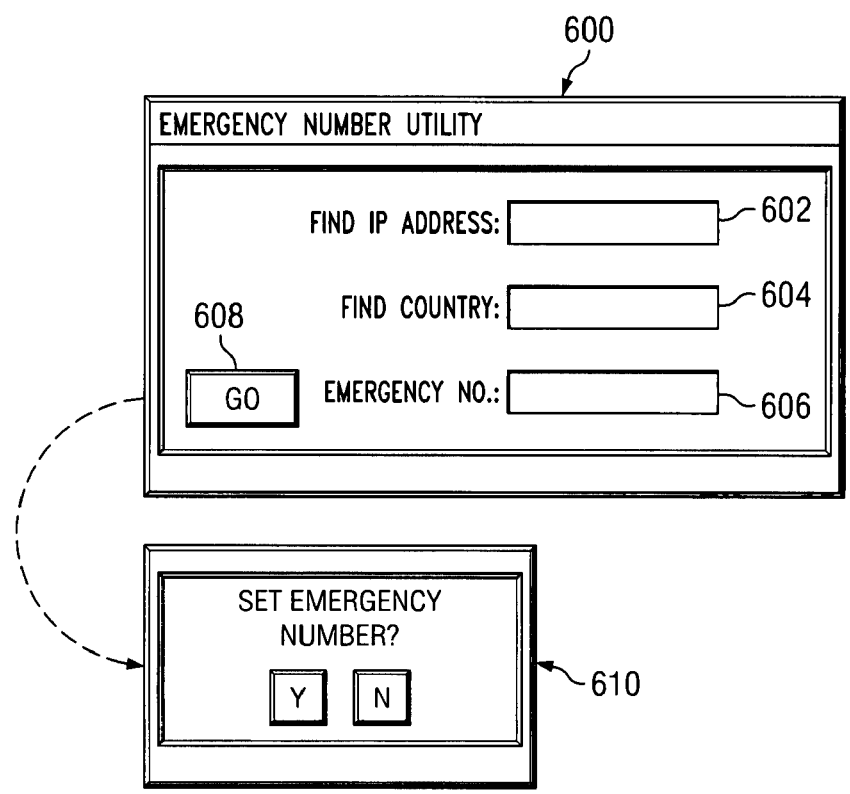
FIG. 6 is a diagram illustrating exemplary graphical user interface according to embodiments of the present invention.

Turning now to FIG. 6, a diagram of an exemplary user interface for an emergency number utility in accordance with embodiments of the present invention is shown. The utility may be implemented as a standalone or may be a web page or a plug in for a web browser. The interface 600 includes fields for an IP address 602, a country 604, and an emergency number 606. In operation, according to one embodiment of the present invention, the user can select the "Go" button 608 to activate the function. In response, the emergency number utility will seek out the desired information and fill in the fields with the corresponding IP address, country, and emergency number.

In some embodiments, the emergency number utility further provides the user with the option to set the emergency number as a quick dial number, as shown at 610. For example, the user may select "Yes" using interface 610, which will set an "emergency number call" key or keys to the desired number. In some embodiments, the user's familiar number can be translated or transcribed into the new situs country number. Thus, for example, a user could dial "911" and have it translated into the situs country's emergency telephone, which would be the number actually dialed by the telephone.

Figure 7:
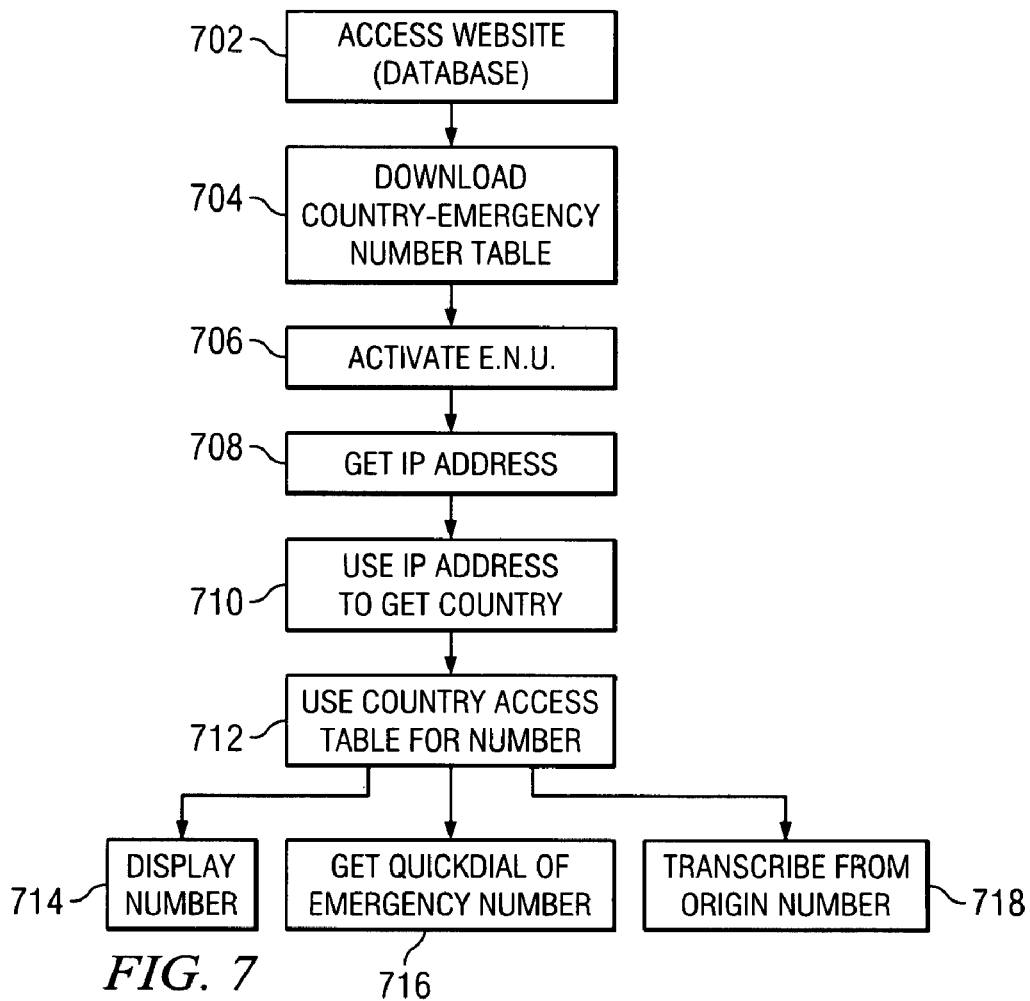
FIG. 7 is a flowchart illustrating operation of an embodiment of the present invention.

FIG. 7 illustrates a flowchart 700 of an embodiment of the present invention. The particular arrangement of elements in the flowchart 700 is not meant to imply a fixed order to the elements; embodiments can be practiced in any order that is practicable.

In a step 702, a user can access a website or a database. In a step 704, a user can download therefrom a country and emergency number table. In a step 706, he can activate his emergency number utility. In a step 708, the emergency number utility can use one of the methods discussed above to obtain the local IP address. In a step 710, the utility can use the IP address to obtain the situs country identity. In a step 712, the country is used to access the emergency number table. Finally, in a step 714, the number can be displayed; or in a step 716 can be programmed as a quickdial; or in a step 718 can be transcribed from an existing emergency number.

Figure 8:
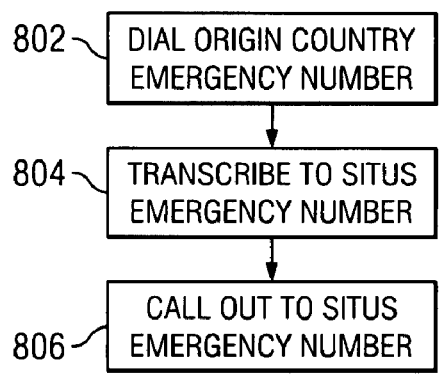
FIG. 8 is a flowchart illustrating operation of an embodiment of the present invention.

FIG. 8 illustrates a flowchart 800 of an embodiment of the present invention. The particular arrangement of elements in the flowchart 800 is not meant to imply a fixed order to the elements; embodiments can be practiced in any order that is practicable.

In a step 802, the user can dial the origin country emergency number. In a step 804, the telephony device can transcribe it to the situs emergency number. Finally, in a step 806, the telephony device can dial out to the situs emergency number.

While specific implementations and hardware/software configurations for the computer and telephone have been illustrated, it should be noted that other implementations and hardware configurations are possible and that no specific implementation or hardware/software configuration is needed. Thus, not all of the components illustrated may be needed for the computer or telephone implementing the methods disclosed herein.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be considered exclusionary transitional phrases, as set forth, with respect to claims, in the United States Patent Office Manual of Patent Examining Procedures (Eighth Edition, August 2001 as revised October 2006), Section 2111.03.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

What is claimed is:

1. A method for determining a local country emergency telephone number, comprising:
   a user device determining a local IP address of the user device;
   the user device determining local country information corresponding to a current location of the user device using the local IP address of the user device; and
   the user device obtaining the local country emergency telephone number using the local country information; and
   wherein the local IP address of the user device is dependent upon a communications network to which the user device is connected.

2. The method of claim 1, wherein the user device determining the local IP address of the user device comprises extracting the local IP address of the user device from a local router.

3. The method of claim 1, wherein the user device determining the local IP address of the user device comprises using a publicly available Internet service or a private dedicated server.

4. The method of claim 1, wherein the user device determining the local IP address of the user device comprises employing a utility that uses multiple online sites to determine the local IP address.

5. The method of claim 1, wherein the user device comprises a telephone, a cellular telephone, or a Personal Data Assistant.

6. The method of claim 1, wherein the user device determining the local country information comprises using the local IP address of the user device and making a WHOIS query.

7. The method of claim 1, further comprising programming the local country emergency telephone number as a quick dial number in the user device.

8. A mobile computing device, comprising:
   a processor that determines a local IP address of the mobile computing device, that determines a current location of the mobile computing device, and that determines a local country emergency telephone number based on the current location of the mobile computing device; and wherein the processor uses the local IP address to determine the current location of the mobile computing device; and wherein the local IP address of the mobile computing device is dependent upon a communications network to which the mobile computing device is connected.

9. The mobile computing device of claim 8, wherein the processor determines the local country emergency telephone number by comparing the current location to a list of local country emergency telephone numbers that correspond to a plurality of locations.

10. The mobile computing device of claim 8, wherein the processor determines the local IP address by extracting the local IP address from a local router.

11. The mobile computing device of claim 8, wherein the local country emergency telephone number is transcribed to the mobile computing device such that when an origin country emergency number is dialed using the mobile computing device the local country emergency telephone number is called.

12. The mobile computing device of claim 8, wherein the processor determines the local IP address of the mobile computing device using multiple online sites.

13. The mobile computing device of claim 8, wherein the processor determines the local IP address of the mobile computing device using a private dedicated server.

14. The mobile computing device of claim 8, wherein the processor determines the current location using the local IP address of the mobile computing device and making a WHOIS query.

15. A telecommunications device, comprising:
a network interface contained in a non-transitory medium located in the telecommunications device configured to couple the telecommunications device to a voice network and the Internet; and
an emergency number utility contained in the non-transitory medium operably coupled to the network interface and configured to determine a situs country of the telecommunications device and to program an emergency telephone number corresponding to the situs country; and wherein the emergency number utility determines the situs country of the telecommunications device using a local IP address of the telecommunications device; and wherein the local IP address of the telecommunications device is dependent upon a communications network to which the telecommunications device is connected; and wherein the emergency number utility transcribes the local country emergency telephone to the telecommunications device such that when an origin country emergency number is dialed the local country emergency telephone number is called.

16. The method of claim 1, further comprising transcribing the local country emergency telephone number to the user device such that when an origin country emergency number is dialed the local country emergency telephone number is called.

17. The method of claim 1, wherein the local country emergency telephone number is obtained by comparing the local country information with a list of emergency telephone numbers corresponding to a plurality of countries, wherein the list comprises a table or database.

18. The mobile computing device of claim 9, wherein the list of local country emergency telephone numbers that correspond to a plurality of countries is contained in a data storage device located in the mobile computing device.

19. The mobile computing device of claim 9, wherein the list of local country emergency telephone numbers that correspond to a plurality of countries is contained in a data storage device located in a location remote from the mobile computing device.

20. The mobile computing device of claim 8, wherein the processor programs the local country emergency telephone number as a quick dial number in the mobile computing device.

* * * * *